United States Patent
Alrabady et al.

(10) Patent No.: US 10,038,565 B2
(45) Date of Patent: Jul. 31, 2018

(54) METHODS AND SYSTEMS FOR BYPASSING AUTHENTICITY CHECKS FOR SECURE CONTROL MODULES

(71) Applicant: GM Global Technology Operations LLC, Detroit, MI (US)

(72) Inventors: Ansaf I. Alrabady, Livonia, MI (US); Kevin M. Baltes, Wixom, MI (US); J. David Rosa, Clarkston, MI (US); Thomas M. Forest, Macomb, MI (US); Alan D. Wist, Macomb, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 737 days.

(21) Appl. No.: 13/722,810

(22) Filed: Dec. 20, 2012

(65) Prior Publication Data

US 2014/0181526 A1 Jun. 26, 2014

(51) Int. Cl.
- G06F 21/00 (2013.01)
- H04L 29/06 (2006.01)
- H04L 9/32 (2006.01)
- G06F 21/57 (2013.01)

(52) U.S. Cl.
CPC .......... *H04L 9/3281* (2013.01); *G06F 21/572* (2013.01); *H04L 9/3247* (2013.01)

(58) Field of Classification Search
CPC .... G06F 21/572; H04L 9/3281; H04L 9/3247
USPC .... 713/155, 161, 168, 169, 170, 176; 726/2, 726/9, 20; 380/229, 232, 247, 258
See application file for complete search history.

(56) References Cited

U.S. PATENT DOCUMENTS

| | | | | |
|---|---|---|---|---|
| 6,697,948 | B1 * | 2/2004 | Rabin | G06F 21/10 705/52 |
| 6,928,550 | B1 * | 8/2005 | Le Pennec | G06F 21/565 713/188 |
| 7,788,553 | B2 * | 8/2010 | Chow et al. | 714/718 |
| 8,296,561 | B2 * | 10/2012 | Kanemura et al. | 713/155 |
| 2001/0020272 | A1 * | 9/2001 | Le Pennec | G01N 33/0034 726/24 |
| 2003/0188117 | A1 * | 10/2003 | Yoshino et al. | 711/164 |
| 2005/0138397 | A1 * | 6/2005 | Kusudo et al. | 713/188 |

(Continued)

FOREIGN PATENT DOCUMENTS

| | | |
|---|---|---|
| CN | 1361882 A | 7/2002 |
| CN | 1653460 A | 8/2005 |

(Continued)

OTHER PUBLICATIONS

Chinese Patent and Trade Mark Office, Office Action for Chinese Patent Application No. 20131070748.4, dated Apr. 1, 2016.

(Continued)

*Primary Examiner* — Michael Simitoski
(74) *Attorney, Agent, or Firm* — Lorenz & Kopf, LLP (57) ABSTRACT

Methods and systems are provided for bypassing an authenticity check for a secure control module. In one embodiment, a method includes: receiving authenticity data from a secure source, wherein the authenticity data includes a signature and an identifier that is unique to the control module; programming the control module with the authenticity data; and bypassing the authenticity check of a control program of the control module based on the authenticity data.

16 Claims, 7 Drawing Sheets

(56) References Cited

U.S. PATENT DOCUMENTS

| | | | | |
|---|---|---|---|---|
| 2009/0217054 A1* | 8/2009 | Haider | ............ | G06F 21/57 |
| | | | | 713/189 |
| 2009/0282483 A1* | 11/2009 | Bennett | ............ | 726/23 |
| 2011/0106374 A1* | 5/2011 | Margol et al. | ............ | 701/33 |
| 2011/0170837 A1* | 7/2011 | Barnes, Jr. | ............ | 386/239 |
| 2012/0254613 A1* | 10/2012 | Nimura | ............ | G06F 1/3209 |
| | | | | 713/168 |
| 2013/0007348 A1* | 1/2013 | Fai et al. | ............ | 711/103 |

FOREIGN PATENT DOCUMENTS

| | | | |
|---|---|---|---|
| CN | 1950798 | A | 4/2007 |
| CN | 202009452 | U | 10/2011 |
| CN | 102314578 | A | 1/2012 |
| CN | 102446125 | A | 5/2012 |

OTHER PUBLICATIONS

State Intellectual Property Office of the People's Republic of China, Office Action in Chinese Patent Application No. 201310707483.4 dated Nov. 14, 2016.

* cited by examiner

METHODS AND SYSTEMS FOR BYPASSING AUTHENTICITY CHECKS FOR SECURE CONTROL MODULES

TECHNICAL FIELD

The technical field generally relates to methods and systems for bypassing authenticity checks for secure control modules.

BACKGROUND

Vehicle control modules control the operation of one or more components of a vehicle. For example, a control module may function as an engine control module or transmission control module that controls the operation of the engine or transmission of the vehicle. Generally, a vehicle control module includes a control program that includes instructions for controlling the operation of the component. The control program may include, but is not limited to, a boot program, an application program, and calibration data. Memory of the control module may be erased, and/or rewritten in order to replace or update the control program.

A secure production control module typically requires that the control program be digitally signed in order to replace or update the control program. In order to be signed, the control program includes a digital signature that is authentic to a particular control module. The digital signature is typically generated from a secure source, such as a secure server.

Accordingly, it is desirable to provide methods and systems for updating or replacing a control program of a secure controller with an unsigned control program. Furthermore, other desirable features and characteristics of the present invention will become apparent from the subsequent detailed description and the appended claims, taken in conjunction with the accompanying drawings and the foregoing technical field and background.

SUMMARY

Methods and systems are provided for bypassing an authenticity check for a secure control module. In one embodiment, a method includes: receiving authenticity data from a secure source, wherein the authenticity data includes a signature and an identifier that is unique to the control module; programming the control module with the authenticity data; and bypassing the authenticity check of a control program of the control module based on the authenticity data.

In another embodiment, a system includes a secure control module that includes non-volatile memory. A control program includes authenticity data that is received from a secure source, stores the authenticity data in the non-volatile memory, and bypasses the authenticity check based on the authenticity data, wherein the authenticity data includes a signature and an identifier that is unique to the control module.

DESCRIPTION OF THE DRAWINGS

The exemplary embodiments will hereinafter be described in conjunction with the following drawing figures, wherein like numerals denote like elements, and wherein.

DETAILED DESCRIPTION

The following detailed description is merely exemplary in nature and is not intended to limit the application and uses. Furthermore, there is no intention to be bound by any expressed or implied theory presented in the preceding technical field, background, brief summary or the following detailed description. As used herein, the term module and/or device refers to an application specific integrated circuit (ASIC), an electronic circuit, a processor (shared, dedicated, or group) and memory that execute one or more software or firmware programs, a combinational logic circuit, and/or other suitable components that provide the described functionality.

Figure 1:
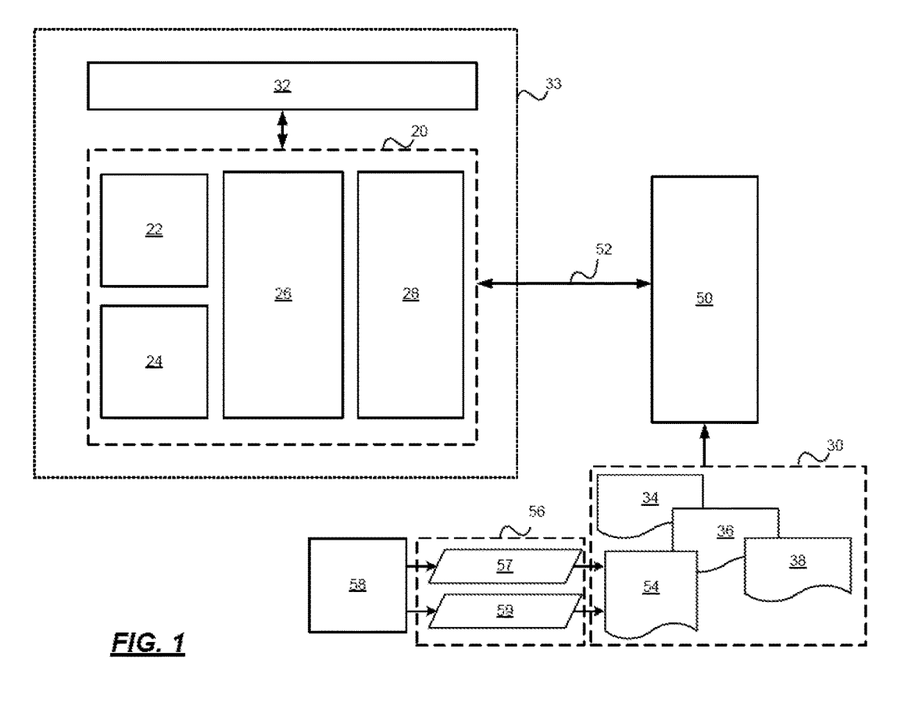
FIG. 1 is a functional block diagram of a control module that includes a authenticity bypass system in accordance with various embodiments.

Referring now to FIG. 1, a control module 20 generally includes volatile memory 22, non-volatile memory 24, a central processing unit (CPU) 26, and an input/output interface 28. While not shown, the control module 20 may also include a power supply module and/or other standard components. The control module 20 stores a control program 30 in the non-volatile memory 24 and/or the volatile memory 22. The CPU 26 operates to control a component 32 of a vehicle 33 based on instructions of the control program 30.

The volatile memory 22 stores temporary data used by the control program 30. Generally, the contents of the volatile memory 22 are lost upon shutdown and/or re-initialized (e.g. written to zero) upon reset of the control module 20. However, the volatile memory 22 may include a temporary memory region for preserving permanent data. Certain data may be stored in the temporary memory region during the operation of the control module 20. The data may then be transferred to an available region of the non-volatile memory 24 prior to shutdown of the control module 20. In this manner, the data stored in the temporary memory region is preserved in the non-volatile memory 24 before the volatile memory 22 is erased.

The non-volatile memory 24 stores the control program 30. In various embodiments, the non-volatile memory 24 includes rewritable and/or non-rewritable regions. The control program 30 generally includes a boot program 34, an application program 36, and one or more calibration files 38. In various embodiments, the boot program 34, the application program 36, and the calibration files 38 may be stored in any of the rewritable and non-rewritable regions. For example, as shown in FIGS. 2, 3, 6, and 10, the non-volatile memory 24 may be partitioned into boot memory 40, application memory 42, and calibration memory 44. The boot memory 40 stores the boot program 34. The application memory 42 stores the application program 36. The calibration memory 44 stores the calibration files 38.

With reference back to FIG. 1, generally, the boot program 34 is executed by the CPU 26 upon power-up or resetting of the control module 20 (i.e. when the control module 20 is in a "boot mode"). For example, the boot program 34 may determine whether proper application or calibration data is present. Additionally, the boot program 34 may verify the integrity of the application program or calibration files. If the boot program 34 verifies the presence and integrity of all required software and/or data, the CPU 26 executes the application program 36 (i.e. when the control module 20 is in an "application mode").

The application program 36 is executed by the CPU 26 to control the one or more components 32 of the vehicle 33. The CPU 26 executes instructions of the application program 36 using calibration data from the calibration files 38. The calibration data may be particular to the one or more components 32 and/or may be particular to the selected vehicle 33.

A data rewriting module 50 communicates with the control module 20 via a medium 52 (e.g., that is either wired or wireless) and the input/output interface 28 in order to erase or rewrite the control program 30 stored in the non-volatile memory 24. In various embodiments, the data rewriting module 50 may be part of the vehicle 33, and/or or may be implemented as a device separate from the vehicle 33 (as shown).

The control program 30 to be rewritten includes an authenticity bypass system 54 in accordance with various embodiments. As will be discussed in more detail with regard to FIGS. 2-11, the authenticity bypass system 54 may be implemented in any one of the boot program 34, the application program 36, and/or the calibration files 38. Generally, the authenticity bypass system 54 stores and performs authenticity bypass methods that can be used by the control module 20 when the control module 20 is a secure production control module to bypass an authenticity check. The authenticity bypass systems and methods utilize authenticity bypass data 56.

In various embodiments, the authenticity bypass data 56 is generated by a secure source 58 upon request (e.g., by a production server that stores production control module information). At a minimum the authenticity bypass data 56 includes an authenticity signature 57, and an control module identifier 59 (referred to as an ECU ID). The signature 57 and the ECU ID 59 are unique to each production control module 20.

Figure 2:
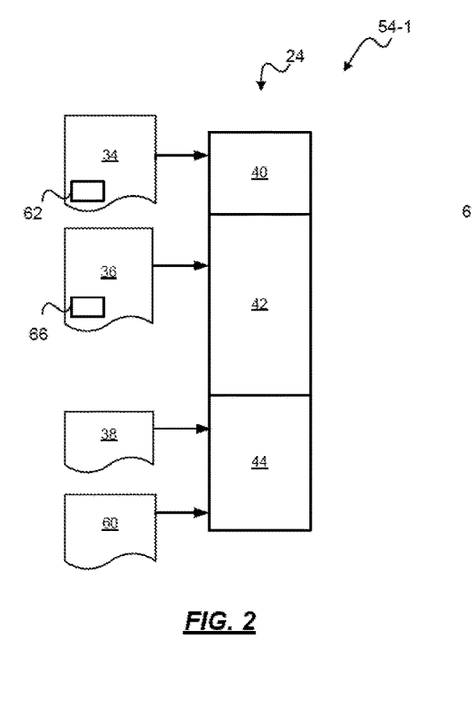
FIGS. 2 and 3 are block diagrams illustrating memory of the control module and an authenticity bypass system in accordance with various embodiments.
Figure 3:
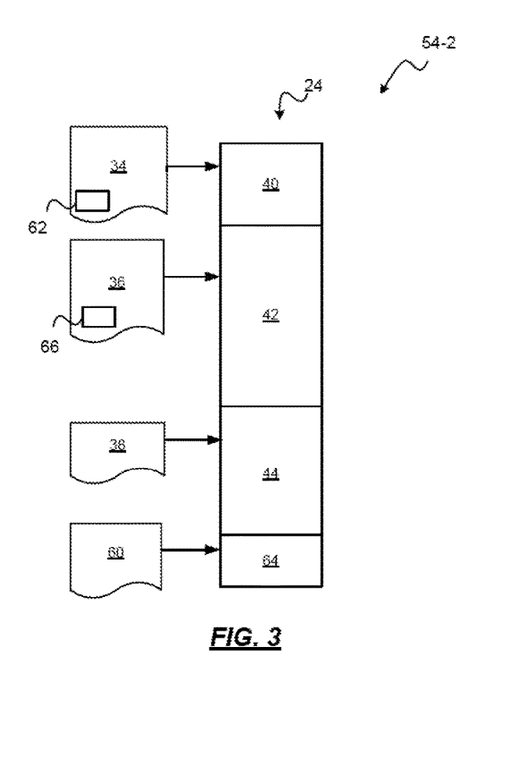

Referring now to FIGS. 2 and 3, a block diagram illustrates authenticity bypass systems 54-1, 54-2 in accordance with various embodiments. In these embodiments, the authenticity bypass systems 54 store the authenticity bypass data 56 in the form of a security ticket 60. The security ticket 60 is then used to turn on and off an authenticity bypass function 62 of the boot program 34.

In various other embodiments, as shown in FIG. 2, the security ticket 60 is stored in a designated memory location of the calibration memory 44. The security ticket 60 stored in the calibration memory 44, for example, based on conventional calibration file programming methods of the data rewriting module 50 (FIG. 1).

In various embodiments, as shown in FIG. 3, the security ticket 60 is stored in a designated memory location (e.g., a memory location used to emulate EEPROM) that is separate from the boot memory 40, the application memory 42, and the calibration memory 44 and that is referred to as the authenticity memory 64. The security ticket 60 is stored in the authenticity memory 64 by a key write function 66 of the application program.

Figures 4, 5:
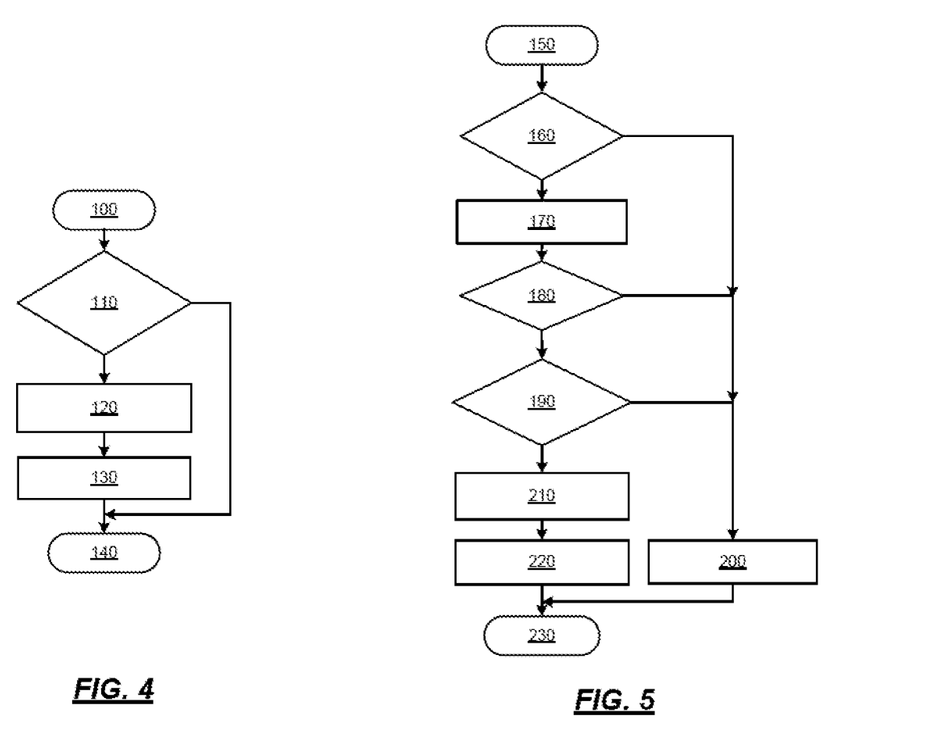
FIGS. 4 and 5 are flowcharts illustrating authenticity bypass methods that may be performed by the authenticity bypass systems of FIGS. 2 and 3 in accordance with various embodiments.

For example, as shown in FIG. 4 and with continued reference to FIGS. 1 and 2, when the control module 20 (FIG. 1) is in the application mode at 100, it is determined whether a request to write the security ticket 60 (e.g., that is generated by the data rewriting module 50) to the authenticity memory 64 is received at 110. If the request is received at 110, optionally the security ticket is verified at 120. The security ticket 60 is written to the authenticity memory 64 at 130. Thereafter, the method continues in the application mode at 140. If, however, the request is not received at 110, the method may continue in the application mode at 140.

As shown in FIG. 5 and with continued reference to FIGS. 1, 2 and 3, when in the control module 20 is in the boot mode (e.g., after a rest of the control module 20) at 150, it is determined whether the security ticket 60 is stored in the authenticity memory 64 at 160. If the security ticket 60 is stored in the authenticity memory 64 at 160, the authenticity data 56 is read from the security ticket 60 at 170. It is determined whether the security ticket 60 is authentic based on the signature data 56 at 180. If the signature 57 indicates that the security ticket 60 is authentic at 180, the ECU ID 59 is evaluated at 190. If, however the security ticket 60 is not authentic at 180, the method continues with performing the authenticity check at 200. Thereafter, the method may continue in the boot mode at 230.

If, at 190, if the ECU ID 59 does not match the ECU ID stored in the boot program 62, then the method continues with performing the authenticity check at 200. Thereafter, the method may continue in the boot mode at 230.

If, at 190, the ECU ID 59 matches an ECU ID stored in the boot program 34, then the authenticity bypass flag of the boot program 34 is set to TRUE (i.e., enabling the bypass function) at 210 and the authenticity check of programmed application programs or calibration files is bypassed at 220. Thereafter, the method may continue in the boot mode at 230.

Figure 6:
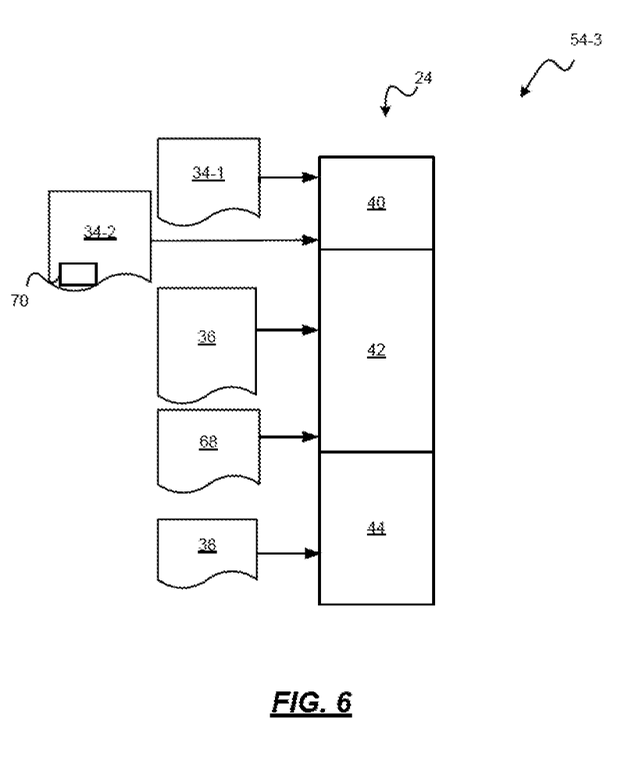
FIG. 6 is a block diagram illustrating memory of the control module and an authenticity bypass system in accordance with various other embodiments.

Referring now to FIG. 6, a block diagram illustrates an authenticity bypass system 54-3 in accordance with various other embodiments. In this embodiment, the authenticity bypass system 54-3 stores the authenticity bypass data 56 in the form of an authenticity bypass program 68. The authenticity bypass program 68 is then used to reprogram a production boot program 34-1 with a development boot program 34-2 that includes a signature bypass function 70. In various embodiments, the authenticity bypass program 68 is stored in the application memory 42 by, for example, the production boot program 34-1 when reprogramming.

Figure 7:
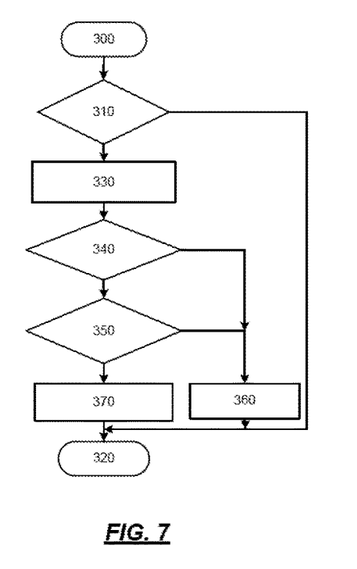
FIGS. 7, 8 and 9 are flowcharts illustrating authenticity bypass methods that may be performed by the authenticity bypass system of FIG. 6 in accordance with various embodiments.
Figure 8:
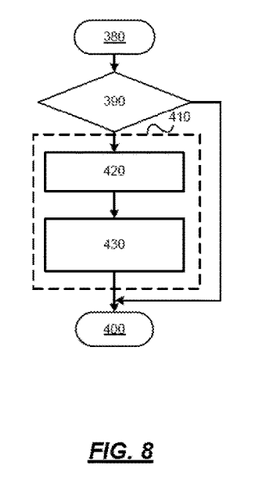
Figure 9:
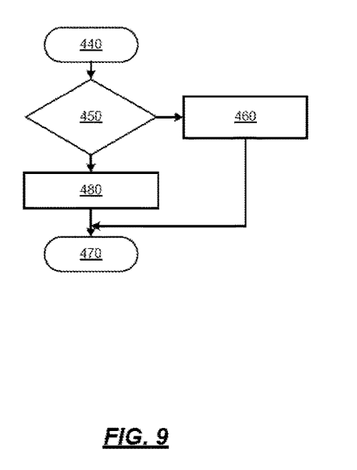

For example, with reference to FIGS. 7-9 and with continued reference to FIGS. 1 and 6, when the control module 20 is in the production boot mode at 300 of FIG. 7, it is determined whether the authenticity bypass program 68 is received at 310. If the authenticity bypass program 68 is not received at 310, the method continues in the production boot mode at 320. If, however, the authenticity bypass program 68 is received at 310, the security data 56 of the bypass program 68 are read at 330 and evaluated at 340 and 350. If, at 340, the signature 57 indicates that the authenticity bypass program 68 is authentic, then the control module 20 continues with evaluating the ECU ID 59 at 350. Otherwise, if the signature 57 indicates that the authenticity bypass program 58 is not authentic at 340, the authenticity bypass program 68 is rejected at 360 and the control module 20 continues in the production boot mode at 320.

If, at 350, the ECU ID 59 matches a stored ECU ID in the production boot program 34-1, the bypass program 68 is stored in the application memory 42 at 370 and the control module 20 continues in the production boot mode at 320. If, however, the ECU ID 59 does not match the stored ECU ID in the production boot program 34-1 at 350, the authenticity bypass program 68 is rejected at 360 and the control module 20 continues in the production boot mode at 320.

As shown in FIG. 8, when the control module 20 is in the application mode at 380, optionally it is determined whether the authenticity bypass program 68 is present at 390. If the authenticity bypass program 68 is not present at 390, the control module 20 continues in the application mode at 400.

If, however, it is determined that the authenticity bypass program 68 is present in the application memory 42, the authenticity bypass program 68 is run at 410. For example, the authenticity bypass program 68 erases the production boot program 34-1 from the boot memory 40 at 420 and writes the development boot program 34-2 to the boot memory 40 at 430. Thereafter, the control module 20 continues in the application mode at 400.

As shown in FIG. 9, when the control module 20 is in the development boot mode at 440 (e.g., after a reset of the control module 20), it is determined whether the authenticity bypass function 70 is enabled at 450. If the authenticity bypass function 70 is not enabled at 450, the authenticity check is performed at 460 and the control module 20 continues in the development boot mode at 470. If, however, the authenticity bypass function 70 is enabled at 450, the authenticity check is bypassed at 480 and the control module 20 continues in the development boot mode at 470.

Figure 10:
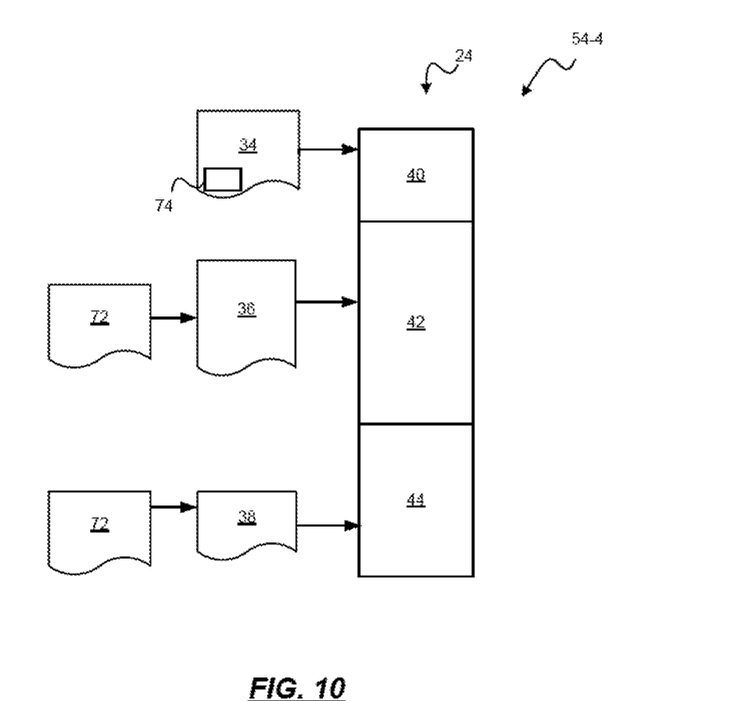
FIG. 10 is a block diagram illustrating memory of the control module and an authenticity bypass system in accordance with various other embodiments.

Referring now to FIG. 10, a block diagram illustrates an authenticity bypass system 54-4 in accordance with various other embodiments. In this embodiment, the authenticity bypass system 54-4 stores the authenticity bypass data 56 in the form of an authenticity bypass header 72. The authenticity bypass header 72 is attached to the application program 36 and/or the calibration file 38, or alternatively to each of the application files of the application program 36 and/or to each of the calibration files 38. The authenticity bypass header(s) 72 is then used to turn on and off an authenticity bypass function 74 of the boot program 34 as the application program 36 and/or the calibration files 38 are being programmed to the control module 20.

Figure 11:
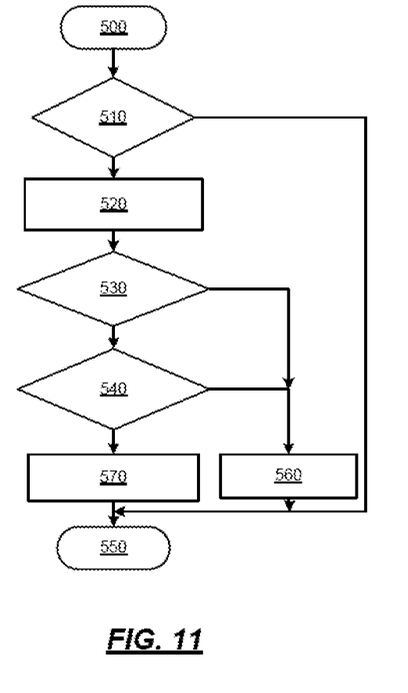
FIG. 11 is a flowchart illustrating an authenticity bypass method that may be performed by the authenticity bypass system of FIG. 10 in accordance with various embodiments.

For example, with reference to FIG. 11 and with continued reference to FIGS. 1 and 10, when the control module 20 is in the boot mode at 500, if a programming package including the application program 36 and/or the calibration files 38 is received at 510, the header(s) 72 is extracted at 520 and evaluated at 530 and 540. If, however, the programming package is not received at 510, the control module 20 continues in the boot mode at 550.

If, at 530, the signature 57 of the header 72 indicates that the application program 36 (or application file) or the calibration file 38 is authentic, then the control module 20 continues with evaluating the ECU ID 59 of the header at 540. Otherwise, if the signature 57 indicates that the application program 36 (or application file) or the calibration file 38 is not authentic at 530, the application program 36 or calibration file 38 is rejected at 560 and the control module 20 continues in the boot mode at 550.

If, at 540, the ECU ID 59 matches a stored ECU ID in the boot program 34, the application program 36 or calibration file 38 is stored in the application memory 42 or calibration memory 44 at 570 (without performing the authenticity check) and the control module 20 continues in the boot mode at 550. If, however, the ECU ID 59 does not match the stored ECU ID in the boot program 34 at 540, the application program 36 or the calibration file 38 is rejected at 560 and the control module 20 continues in the boot mode at 550.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the disclosure in any way. Rather, the foregoing detailed description will provide those skilled in the art with a convenient road map for implementing the exemplary embodiment or exemplary embodiments. It should be understood that various changes can be made in the function and arrangement of elements without departing from the scope of the disclosure as set forth in the appended claims and the legal equivalents thereof.

What is claimed is:

1. A method of bypassing an authenticity check for a secure control module, comprising:
   receiving authenticity data from a secure source, wherein the authenticity data includes a signature and an identifier (ID) that is unique to the control module;
   programming the control module with the authenticity data; and
   selectively bypassing the authenticity check of a control program of the control module when the signature of the authenticity data is valid and when the ID of the authenticity data matches an identifier of the control module, wherein the control program includes instructions that when executed by a processor control one or more components of a vehicle,
   wherein the authenticity check authenticates a digital signature of the control program.

2. The method of claim 1, further comprising combining the authenticity data with at least one file of the control program, and wherein the programming the control module with the authenticity data comprises programming the control module with the at least one file and the authenticity data.

3. The method of claim 1, wherein the programming the control module with the authenticity data comprises storing the authenticity data as an authenticity application program in application memory.

4. The method of claim 3, further comprising running the authenticity application program to erase a production boot program from boot memory and write a development boot program to boot memory.

5. The method of claim 4, wherein the bypassing the authenticity check of the control program is performed by the development boot program.

6. The method of claim 1, wherein the programming the control module with the authenticity data comprises storing the authenticity data in a designated memory location.

7. The method of claim 6, wherein the bypassing the authenticity check of the control program comprises selectively bypassing the authenticity check of the control program when the authenticity data is stored in the designated memory location.

8. The method of claim 6, wherein the designated memory location is in calibration memory.

9. The method of claim 6, wherein the designated memory location is in a memory location that is not part of application memory and calibration memory.

10. The method of claim 1 wherein the authenticity data is programmed to the control module in the form of a file header.

11. The method of claim 1 wherein the authenticity data is programmed to the control module in the form of an application program.

12. The method of claim 1 wherein the authenticity data is programmed to the control module in the form of a security ticket.

13. A system for bypassing an authenticity check, comprising:
- a secure control module that includes non-volatile memory and a processor; and
- a control program that includes instructions that when executed by the processor control one or more components of a vehicle, and that includes authenticity data that is received from a secure source, that stores the authenticity data in the non-volatile memory, and that selectively bypasses the authenticity check of the control program when a signature of the authenticity data is valid and when an identifier (ID) of the authenticity data matches a unique identifier of the control module, wherein the authenticity check authenticates a digital signature of the control program.

14. The system of claim 13, wherein the non-volatile memory is partitioned into at least boot memory, application memory, and calibration memory, and wherein the authenticity data is stored in application memory.

15. The system of claim 13, wherein the non-volatile memory is partitioned into at least boot memory, application memory, and calibration memory, and wherein the authenticity data is stored in calibration memory.

16. The system of claim 13, wherein the non-volatile memory is partitioned into at least boot memory, application memory, calibration memory, and authenticity memory, and wherein the authenticity data is stored in the authenticity memory.

* * * * *